US012659332B2

(12) United States Patent
Lecroart et al.

(10) Patent No.: US 12,659,332 B2
(45) Date of Patent: Jun. 16, 2026

(54) SECURE PLATFORM FOR PROCESSING DATA

(71) Applicant: ATOS FRANCE, Bezons (FR)

(72) Inventors: Yannick Lecroart, La Grand Motte (FR); Kamal Ayoubi, Montpellier (FR); Loïc Maisonnasse, Mauguio (FR)

(73) Assignee: ATOS FRANCE, Bezons (FR)

( * ) Notice: Subject to any disclaimer, the term of this patent is extended or adjusted under 35 U.S.C. 154(b) by 190 days.

(21) Appl. No.: 18/633,144

(22) Filed: Apr. 11, 2024

(65) Prior Publication Data

US 2024/0348633 A1      Oct. 17, 2024

(30) Foreign Application Priority Data

Apr. 12, 2023    (EP) ..................................... 23305547

(51) Int. Cl.
*H04L 9/40*        (2022.01)
*H04L 41/16*       (2022.01)

(52) U.S. Cl.
CPC .......... *H04L 63/1425* (2013.01); *H04L 41/16* (2013.01); *H04L 63/1458* (2013.01)

(58) Field of Classification Search
CPC .. G06F 9/4881; G06F 9/5016; G06F 21/6245; G06F 40/20; G06F 16/288; G06F 16/182; G06F 16/1744; G06F 9/505; G06F 21/64; G06F 21/57; H04L 47/125; H04L 45/7453; H04L 45/66; H04L 9/50; H04L 9/30; H04L 63/20; H04L 9/006; H04L 63/06; H04L 63/10; H04L 63/123; H04L 9/0825; H04L 67/12; H04L 67/1097;

H04L 63/1425; H04L 63/1433; H04L 67/147; H04L 63/1416; H04L 9/0643; H04L 9/3252; H04L 9/3239; H04L 63/12; H04L 9/0637; H04L 63/1458; H04L 41/16; G06Q 20/065; G06Q 20/3823; G06Q 20/40;

(Continued)

(56) References Cited

U.S. PATENT DOCUMENTS

| | | | |
|---|---|---|---|
| 11,444,966 B2 | 9/2022 | O'Hara | |
| 2014/0351820 A1* | 11/2014 | Lee ........................ | G06F 9/4881 718/103 |

(Continued)

OTHER PUBLICATIONS

European Search Report and Written Opinion issued in EP23305547 on Sep. 6, 2023.

(Continued)

*Primary Examiner* — Kyung H Shin
(74) *Attorney, Agent, or Firm* — ARC IP Law, PC; Joseph M. Mayo

(57)          ABSTRACT

The invention relates to a data processing platform that includes a computing server and a compliance server distinct from each other. The computing server receives a data stream from at least one source, and executes, based on the data stream, a data processing process including at least one task. At each execution of a task, the computing server transmits, to the compliance server, a request including contextual data representative of an execution context of the task. The compliance server loads, from a blockchain, pre-established compliance data; compares the received contextual data with the loaded compliance data; and generates an alert based on a result of the comparison.

8 Claims, 1 Drawing Sheet

(58) Field of Classification Search
CPC .. G06Q 40/12; G06Q 10/0833; G06Q 10/101;
G06Q 10/20; G06Q 30/018; G06N 20/00
See application file for complete search history.

(56) References Cited

U.S. PATENT DOCUMENTS

| | | | |
|---|---|---|---|
| 2016/0021138 A1* | 1/2016 | McGloin | G06F 16/1744 |
| | | | 726/23 |
| 2018/0268491 A1* | 9/2018 | Cuomo | G06Q 40/12 |
| 2020/0067838 A1* | 2/2020 | Perumal | H04L 47/125 |
| 2020/0074410 A1* | 3/2020 | Binder | G06F 16/182 |
| 2020/0175195 A1* | 6/2020 | Nomura | G06F 21/6245 |
| 2021/0150411 A1 | 5/2021 | Wilhelmus et al. | |
| 2021/0211468 A1* | 7/2021 | Griffin | H04L 9/50 |
| 2021/0256421 A1 | 8/2021 | Sundaresan | |
| 2023/0199004 A1* | 6/2023 | Texada | H04L 63/1425 |
| | | | 726/22 |
| 2024/0193546 A1* | 6/2024 | Hooker | G06F 40/20 |

OTHER PUBLICATIONS

Preuveneers Davy et al: "Chained Anomaly Detection Models for Federated Learning: An Intrusion Detection Case Study", Applied Sciences, vol. 8, No. 12, Dec. 18, 2018.

* cited by examiner

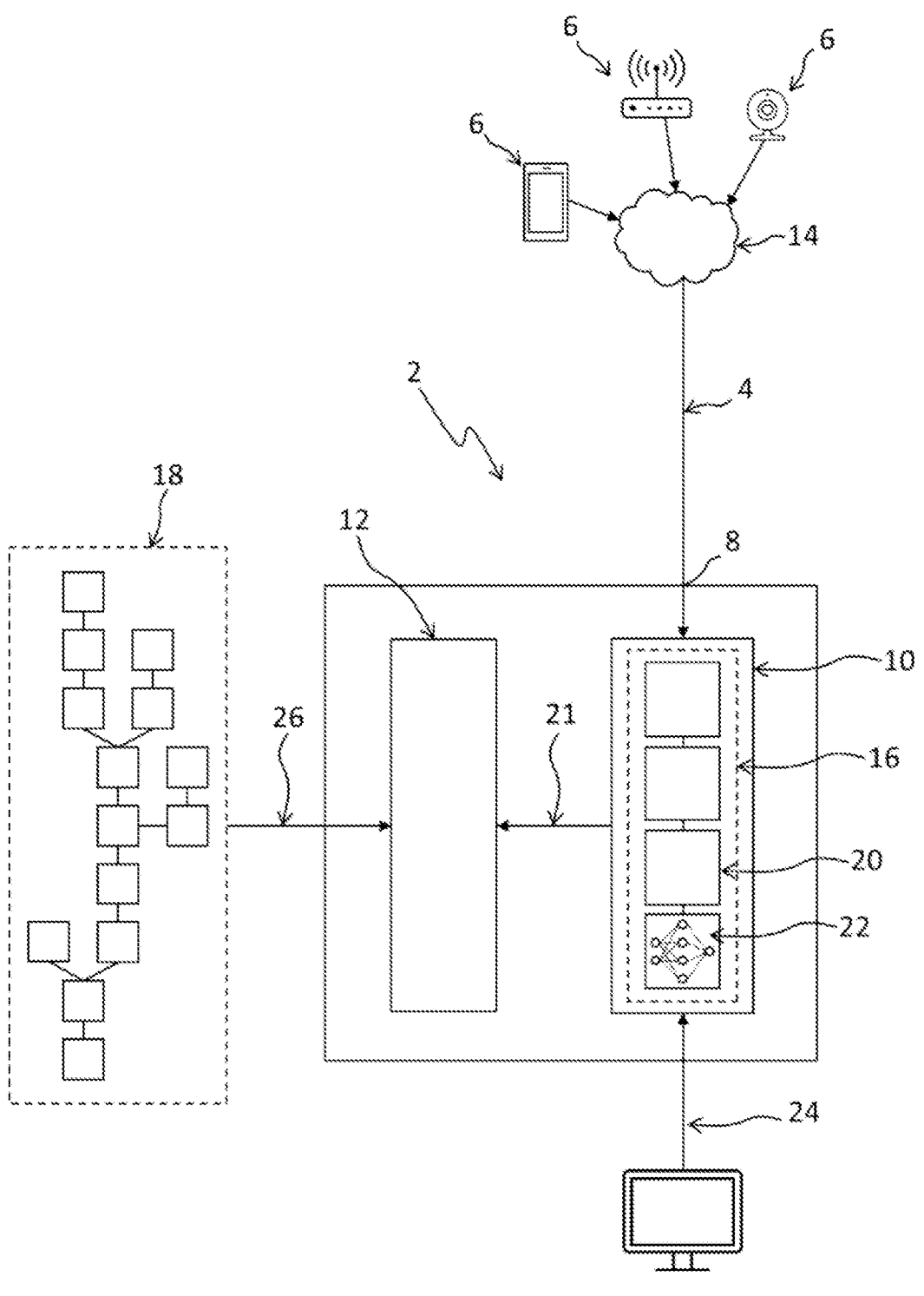

SECURE PLATFORM FOR PROCESSING DATA

This application claims priority to European Patent Application Number 23305547.4, filed 12 Apr. 2023, the specification of which is hereby incorporated herein by reference.

BACKGROUND OF THE INVENTION

Field of the Invention

At least one embodiment of the invention relates to a data processing platform.

At least one embodiment of the invention applies to the field of connected objects, and in particular to the processing of data provided by such connected objects.

Description of the Related Art

In the field of artificial intelligence, it is known to implement applications for securing applications and machine learning platforms, in order to protect against attacks.

In particular, it is known to secure a communication channel by which data processing requests (such as prediction requests) are sent to a server implementing a previously trained artificial intelligence model to respond to such requests.

However, such a security strategy is not entirely satisfactory.

Indeed, such a security strategy is not very effective against so-called "poisoning" attacks of a data processing process, through which hackers aim to:

- manipulate training datasets of the artificial intelligence model (dataset poisoning), so as to introduce biases during the learning process, for example by means of incorrectly labeled or intentionally modified data/falsified data;
- alter the algorithm making it possible to generate the artificial intelligence model (algorithmic poisoning), in particular by modifying hyperparameters and/or an architecture of the artificial intelligence model, for example a number of layers of a neural network;
- replace the artificial intelligence model deployed on the server, called "in production", with another one (model poisoning), by modifying configuration and deployment files specifying a version of the artificial intelligence model to be deployed in production.

One aim of at least one embodiment of the invention is to solve at least one of the shortcomings of the state of the art.

Another purpose of at least one embodiment of the invention is to propose a data processing platform that is less vulnerable to such attacks.

BRIEF SUMMARY OF THE INVENTION

To this end, at least one embodiment of the invention relates to a data processing platform of the aforementioned type, comprising an input port for receiving a data stream from at least one source, a computing server and a compliance server, the computing server and the compliance server being distinct from each other and in communication with each other, the computing server being connected to the input port and the compliance server not being connected to the input port, the computing server being configured to:

execute, based on the received data stream, a data processing process comprising at least one task; and transmit to the compliance server, at each execution of a task of the data processing process, a request comprising contextual data representative of an execution context of the task, the compliance server being configured to:

load, from a blockchain, pre-established compliance data; and compare the contextual data received from the computing server with the compliance data loaded from the blockchain;

generate an alert based on a result of the comparison.

Indeed, by virtue of such a platform, each task of the data processing process is subject to a verification of the context in which it was executed. In other words, the compliance server is intended to verify that the execution context of each task of the data processing process (in particular the training data used, the parameters of the implemented artificial intelligence model, or even the artificial intelligence model in production) matches previously established compliance data, for example by an administrator.

Additionally, the storage of compliance data on a blockchain, i.e., the decentralization of compliance data to a trusted ledger, ensures the authenticity and integrity of the compliance data over time.

Furthermore, since the compliance server is not connected to the input port, it is less likely to be the target of attacks.

In this way, by virtue of one or more embodiments of the invention, the identity of the actors, the integrity of the data and actions carried out during each task of the data processing process are ensured, and attempts at poisoning are prevented.

Advantageously, the method according to at least one embodiment of the invention has one or more of the following characteristics, taken individually or in any technically possible combination:

the computing server is configured to store at least one artificial intelligence model, the at least one task of the data processing process involving training of the at least one artificial intelligence model based on the training data dependent on the received data stream;

the computing server is configured to store at least one previously trained artificial intelligence model, the at least one task of the data processing process involving processing, by the at least one previously trained artificial intelligence model, raw data dependent on the received data stream;

the compliance server is configured to command, in case of a mismatch between the contextual data received from the computing server and the loaded compliance data, an interruption of the execution of the data processing process by the computing server;

the compliance server is configured to record, in the blockchain, compliance information representative of a situation where, for each of the tasks of the processing process, the compliance server has determined a match of the corresponding contextual data with the loaded compliance data;

the compliance information comprises a timestamp and/or an electronic signature from the compliance server;

the compliance data comprises, for each task, a description of:

input data acceptable for executing the task;

acceptable commands for executing the task;

rules relating to acceptable actions during execution of the task;

acceptable steps for executing the task; and/or actors authorized to execute the task;

for each task, the contextual data comprises a description of:

input data implemented during execution of the task;

commands implemented during execution of the task;

actions carried out during execution of the task;

steps implemented during execution of the task; and/or actors that have executed the task;

the compliance data is associated with an expiration date, the compliance server being configured to compare the received contextual data with the loaded compliance data only if a current date is earlier than the expiration date;

the computing server is configured to execute the data processing process in response to receiving a data processing request from an external agent, the computing server further being configured to reject a data processing request if, during a first predetermined time interval to a current date, a total number of received data processing requests is greater than a first predetermined threshold;

the compliance server is configured to reject a request from the computing server if, during a second predetermined time interval to a current date, a total number of requests received from the computing server is greater than a second predetermined threshold.

BRIEF DESCRIPTION OF THE DRAWINGS

The one or more embodiments of the invention will be better understood by reading the following description, given solely by way of non-limiting example and with reference to the accompanying drawings, wherein:

FIG. 1 is a schematic depiction of a data processing platform according to one or more embodiments of the invention.

It is understood that the one or more embodiments which will be described hereinafter are in no way limiting. It will in particular be possible to imagine variants of at least one embodiment of the invention comprising only a selection of features described below isolated from the other features described, if this selection of features is sufficient to confer a technical advantage or to differentiate the one or more embodiments of the invention from the prior art. This selection comprises at least one preferably functional feature without structural details, or with only a part of the structural details if this part is only sufficient to confer a technical advantage or to differentiate the one or more embodiments of the invention from the prior art.

In particular, all the variants and all the embodiments described can be combined with one another, provided there are no technical obstacles to such combination.

In the figures and in the rest of the description, the elements common to multiple figures retain the same reference.

DETAILED DESCRIPTION OF THE INVENTION

A data processing platform 2 (hereinafter "processing platform") according to one or more embodiments of the invention is illustrated in FIG. 1.

The processing platform 2 is intended for processing a data stream 4 from at least one source 6.

In a non-limiting manner, in at least one embodiment, such a source 6 is a connected object. According to another example, in at least one embodiment, such a source 6 is a memory storing data to be processed. According to yet another example, in at least one embodiment, such a source is a user terminal via which a user provides data and/or a configuration to the processing platform 2.

The processing platform 2 comprises an input port 8, a computing server 10 and a compliance server 12.

The input port 8 is intended to be connected to each source 6, in particular through a communication network 14, to receive the data stream 4.

As shown in FIG. 1, the computing server 10 and the compliance server 12 are distinct from each other and in communication with each other. In addition, the computing server 10 is connected to the input port 8, while the compliance server 12 is not connected to the input port 8.

The computing server 10 is configured to receive the data stream 4 from the input port 8 and to execute a data processing process 16 (hereinafter "processing process") based on the received data stream 4. Such a processing process 16 comprises at least one task 20.

Additionally, the compliance server 12 is configured to verify that the execution of processing process 16 complies with pre-established criteria. In particular, the compliance server 12 is configured to verify that the execution of each task 20 complies with pre-established criteria.

Such criteria, which will be further described below, have, in particular, been established beforehand by a project manager, a security service, or any other person or entity having a sufficient level of accreditation, and hereinafter referred to by "administrator". Furthermore, such criteria are stored in a blockchain 18 to form compliance data. In particular, the compliance data have been recorded in the blockchain 18 by means of a transaction in which the compliance data are encoded and encrypted.

The compliance server 12 is configured to communicate with the blockchain 18.

The at least one of the computing server 10 and the compliance server 12 may be in hardware form, such as a computer, a server, a processor, an electronic chip, etc. Alternatively, or additionally, the at least one of the computing server 10 and the compliance server 12 may be in software form, such as a computer program, or an application, for example an application for a user device such as a tablet or smartphone.

Computing Server 10

As indicated above, the computing server 10 is configured to receive the data stream 4 from the input port 8 and to execute the processing process 16 based on the received data stream 4.

Preferably, in at least one embodiment, the computing server 10 is configured to execute the processing process 16 in response to receiving a data processing request 24. Such a data processing request 24 originates from an external agent (i.e., external to and distinct from the processing platform 2), for example, a user of the processing platform 2.

In this case, the computing server 10 is advantageously configured to reject a data processing request 24 if, during a first predetermined time interval to a current date, a total number of data processing requests 24 received is greater than a first predetermined threshold.

By "rejecting the processing request", it is understood, within the meaning of one or more embodiments of the invention, not to trigger the execution of the processing process in response to the receipt of said processing request.

Such a feature is advantageous, insofar as it reduces the risk of a successful denial-of-service attack carried out by a malicious external agent.

Preferably, the computing server 10 is configured to store at least one artificial intelligence model 22. In this case, at least one task 20 of the processing process 16 involves training the at least one artificial intelligence model 22 based on data dependent on the data stream 4 (referred to as "training data"). More specifically, the training data comprise all or part of the data stream 4, or are obtained from the data stream 4, at the end of the execution of one or more previous tasks 20 of the processing process 16.

Alternatively, or in a complementary manner, the computing server 10 is configured to store at least one previously trained artificial intelligence model 22. In this case, at least one task 20 of the processing process 16 comprises processing, by the trained artificial intelligence model 20, of data dependent on the data stream 4 (referred to as "raw data"). More specifically, the raw data comprise all or part of the data stream 4, or are obtained from the data stream 4, at the end of the execution of one or more preceding tasks 20 of the processing process 16.

For example, the at least one trained artificial intelligence model is the result of training implemented during a preceding task 20 of the processing process 16.

Furthermore, the computing server 10 is configured to transmit, to the compliance server 12, a request 21 at each execution of a task 20 of the processing process 16. For each task 20 executed, the request 21 comprises contextual data representative of an execution context of the task 20.

Preferably, the contextual data comprises a description of the input data implemented during execution of the task 20, i.e., the data based on which the task 20 was executed. For example, such input data comprise the training data used to train an artificial intelligence model, or even the parameters of the implemented artificial intelligence model.

Alternatively, or in a complementary manner, the contextual data comprises a description of the output data obtained at the end of the execution of the task 20.

Alternatively, or in a complementary manner, the contextual data comprises a description of the commands implemented during execution of the task 20. Such commands are, for example, software functions called during execution of the task 20, such as a trained artificial intelligence model used for executing the task 20.

Alternatively, or in a complementary manner, the contextual data comprises a description of the actions implemented during execution of the task 20. Such actions include, for example, generating a file, deleting a file, or modifying a file during execution of the task 20. For example, in the case of generating a file, the description of the actions comprises a location of the generated file.

Alternatively, or in a complementary manner, the contextual data comprise a description of the steps implemented during execution of the task 20.

Alternatively, or in a complementary manner, the contextual data comprise a description of the actors that executed the task, i.e., a description of the machines or clusters of machines, physical or virtual, that executed the task 20. Furthermore, such a description of the actors that executed the task 20 comprises, for example, a unique identifier for each actor, or an electronic signature from each actor.

The contextual data is, for example, recorded in a JSON file comprising a plurality of fields in the form of key-value pairs in which each of the contextual data is indicated.

Compliance Server 12

As previously indicated, the compliance server 12 is intended to verify that the execution of the processing process 16 complies with the pre-established criteria. More specifically, the compliance server 12 is configured to verify that the execution of each task 20 of the processing process 16 complies with the pre-established criteria, stored in the form of compliance data 26 in the blockchain 18.

To do this, the compliance server 12 is configured to load, from the blockchain 18, the pre-established compliance data 26. In particular, the compliance server 12 is configured to load the compliance data 26 using a block number or hash value relating to the prior recording of the compliance data 26 in the blockchain 18.

Preferably, for each task 20 of the processing process 16, the compliance data 26 comprises a description of acceptable input data for executing the task 20.

Alternatively, or in a complementary manner, the compliance data 26 comprise, for each task 20, a description of the acceptable output data at the end of the execution of the task 20.

Alternatively, or in a complementary manner, the compliance data 26 comprise, for each task 20, a list of acceptable commands for executing the task 20.

Alternatively, or in a complementary manner, the compliance data 26 comprise, for each task 20, rules relating to acceptable actions during execution of the task 20.

Alternatively, or in a complementary manner, the compliance data 26 comprise, for each task 20, a list of acceptable steps for executing the task 20.

Alternatively, or in a complementary manner, the compliance data 26 comprise, for each task 20, a list of the actors authorized to execute the task 20.

The compliance data 26 are, for example, recorded in a JSON (JavaScript Object Notation) file comprising a plurality of fields in the form of key-value pairs in which each of the pre-established criteria is indicated.

Advantageously, the compliance data 26 are electronically signed by the administrator, in order to ensure authenticity of said compliance data 26.

Optionally, the compliance data 26 are associated with an expiration date.

To verify that the execution of the processing process 16 complies with the pre-established criteria, the compliance server 12 is configured to compare, for each step 20, the corresponding contextual data received from the computing server 10 with the compliance data 26 loaded from the blockchain 18.

Advantageously, in the case where the compliance data 26 is associated with an expiration date, the compliance server 12 is configured to compare the contextual data with the compliance data 26 only if a current date is earlier than the expiration date. In this way, it is ensured that the compliance data 26 on which the execution of the processing process 16 will be evaluated are always valid.

Advantageously, for each task 20 of the processing process 16 executed by the computing server 10, the compliance server 12 is configured to record a result of the comparison of the corresponding contextual data with the loaded compliance data 26. For example, the compliance server 12 is configured to record the result of the comparison in an audit database.

Such a feature is advantageous, insofar as it allows for playback in a tool for visualizing compliance interactions, particularly in real-time.

Additionally, the compliance server is configured to generate an alert based on a result of the comparison.

In particular, for each task 20, the compliance server is configured to generate an alert in the event of a mismatch between the corresponding contextual data received from the computing server 10 and the compliance data 26 loaded from the blockchain 18.

Such an alert is, for example, intended for an administrator of the processing platform 2.

Advantageously, in the event of a mismatch between the contextual data received from the computing server 10 for any given task 20 and the loaded compliance data 26, the compliance server 12 is also configured to command an interruption of the execution of the processing process 16 by the computing server 10.

This is advantageous, insofar as it enhances the security of the processing platform 2, such a mismatch between the contextual data and the compliance data 26 constituting a suspicion of attack. In this way, the impact of a poisoning attack is limited.

Advantageously, the compliance server is further configured to record, in the blockchain 18, compliance information representative of a situation where, for each of the tasks 20 of the processing process 16, the compliance server 12 has determined a match of the corresponding contextual data with the loaded compliance data 26.

In this way, the compliance information is tamper-proof.

Preferably, such compliance information comprises a timestamp and/or an electronic signature from the compliance server 12.

Advantageously, the compliance server 12 is configured to reject a request from the computing server 10 if, during a second predetermined time interval to a current date, a total number of requests received from the computing server is greater than a second predetermined threshold.

Such a feature is advantageous, insofar as it is enables the compliance server 12 to guard against attacks, in particular denial-of-service attacks, originating from computing server 10 and/or actors that would be authorized, with regard to the definition of the processing process 16, to intervene in one or more tasks of said processing process 16. Such denial-of-service attack could, for example, aim to overload the compliance server with inspection and/or authentication requests.

Operation

The operation of the processing platform 2 will now be described, according to one or more embodiments of the invention.

During a configuration step, an administrator configures the processing platform 2 to define the processing process 16 to be executed, in particular each task 20 of the processing process 16.

Furthermore, the administrator defines criteria according to which the execution of the processing process 16 (in particular of each task 20) is considered to be compliant.

Then, the administrator records said criteria in the blockchain 18, to form the compliance data 26.

Then, the processing platform 2 is connected to each source 6 to receive, at its input port 8, the data stream 4, which is routed to the computing server 10.

Furthermore, the compliance server 12 loads, from the blockchain 18, the compliance data 26.

Then, the computing server 10 executes the processing process 16, based on the data stream 4, preferably in response to a data processing request 24 received from an agent external to the processing platform 2.

During the implementation of the processing process 16, for each executed task 20, the computing server 10 sends, to the compliance server 12, a request 21 comprising the contextual data representative of the execution context of said task 20.

For each request 21 received from the computing server 10 (i.e., for each task 20 executed), the compliance server 12 compares the corresponding contextual data with the compliance data 26 loaded from the blockchain 18.

Then, depending on a result of the comparison, the compliance server 12 generates an alert. In particular, the compliance server 12 generates an alert in the event of a mismatch between the contextual data corresponding to any given task 20 and the compliance data 26 loaded from the blockchain 18.

Preferably, in the case of such a mismatch, the compliance server 12 further commands an interruption of the execution of the processing process 16 by the computing server 10.

Of course, the at least one embodiment of the invention is not limited to the examples that have just been described.

What is claimed is:

1. A data processing platform comprising:

an input port that receives a data stream from at least one source through a communication network, a computing server; and a compliance server;

wherein the computing server and the compliance server are distinct from each other and in communication with each other, wherein the computing server is connected to the input port and wherein the compliance server is not connected to the input port, wherein the computing server comprises one or more processors operably connected to a memory and is configured to store at least one artificial intelligence model, said at least one artificial intelligence model being previously trained or not, execute, based on the data stream that is received, a data processing process comprising at least one task, said at least one task being at least one of training the at least one artificial intelligence model based on training data dependent on the data stream that is received; and in case the at least one artificial intelligence model is previously trained, processing by the at least one artificial intelligence model that is previously trained, raw data dependent on the data stream; and transmit to the compliance server, upon each execution of a task of the at least one task of the data processing process, a request comprising contextual data representative of an execution context of the task, wherein said contextual data comprises a description of input data based on which the task was executed, said input data comprising training data used to train an artificial intelligence model, and/or parameters of the artificial intelligence model, wherein the compliance server comprises one or more processors operably connected to a memory and is configured to receive from the computing server the request comprising the contextual data;

communicate with a blockchain, said blockchain being external to the data processing platform, and load, from said blockchain, compliance data that is preestablished; said compliance data being associated with an expiration date;

compare the contextual data with the compliance data that is loaded from the blockchain only if a current date is earlier than the expiration date; and generate an alert based on a result of said compare, in case of a mismatch between the contextual data and the compliance data.

2. The data processing platform according to claim 1, wherein the compliance server is configured to command, in case of a mismatch between the contextual data received from the computing server and the compliance data that is loaded, an interruption of execution of the data processing process by the computing server.

3. The data processing platform according to claim 1, the compliance server is configured to record, in the blockchain, compliance information representative of a situation where, for each of the at least one task of the data processing process, the compliance server has determined a match between the contextual data corresponding therewith and the compliance data that is loaded.

4. The data processing platform according to claim 3, wherein the compliance information comprises one or more of a timestamp and an electronic signature from the compliance server.

5. The data processing platform according to claim 1, wherein the compliance data comprises, for each task of the at least one task, a description comprising one or more of
   acceptable input data for executing the each task;
   acceptable commands for executing the each task;
   rules relating to acceptable actions during execution of the each task;
   acceptable steps for executing the each task;
   authorized actors to execute the each task.

6. The data processing platform according to claim 1, wherein, for each task of the at least one task, the contextual data further comprises a description comprising one or more of
   commands implemented during execution of the each task;
   actions performed during execution of the each task;
   steps implemented during execution of the each task;
   actors that executed the each task.

7. The data processing platform according to claim 1, wherein the computing server is further configured to
   execute the data processing process in response to receiving a data processing request from an external agent,
   reject the data processing request if, during a first predetermined time interval to a current date, a total number of data processing requests received is greater than a first predetermined threshold.

8. The data processing platform according to claim 1, wherein the compliance server is further configured to reject said request from the computing server if, during a second predetermined time interval to a current date, a total number of requests received from the computing server is greater than a second predetermined threshold.

\* \* \* \* \*